US006961003B2

(12) United States Patent
Lin (10) Patent No.: US 6,961,003 B2
(45) Date of Patent: Nov. 1, 2005

(54) ELECTRONIC MESSENGER (75) Inventor: Yu-Chieh Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 179 days.

(21) Appl. No.: 10/217,296

(22) Filed: Aug. 12, 2002

(65) Prior Publication Data

US 2003/0107492 A1 Jun. 12, 2003

(30) Foreign Application Priority Data

Dec. 11, 2001 (TW) .............................. 90130611 A (51) Int. Cl.[7] .............................................. G08B 25/08
(52) U.S. Cl. .................. 340/692; 348/14.06; 348/113; 348/143; 348/152; 379/67.1; 379/88.07; 379/88.11; 455/556.1
(58) Field of Search ................................ 340/567, 505, 340/552, 692; 379/67.1, 88.07, 88.11–88.13; 455/556.1, 556.2; 348/14.06, 113, 143, 152

(56) References Cited

U.S. PATENT DOCUMENTS

| 5,365,494 | A | * | 11/1994 | Lynch ........................ 368/10 |
| 5,446,934 | A | * | 9/1995 | Frazier ........................ 5/655 |
| 5,532,680 | A | * | 7/1996 | Ousborne ................... 340/567 |
| 5,654,690 | A | * | 8/1997 | Ishikawa et al. ............ 340/506 |
| 5,786,759 | A | * | 7/1998 | Ling ........................... 340/542 |
| 5,812,870 | A | * | 9/1998 | Kikinis et al. ................ 712/32 |
| 6,137,547 | A | * | 10/2000 | Iijima et al. ................ 348/789 |
| 6,377,664 | B2 | * | 4/2002 | Gerszberg et al. ....... 379/88.13 |
| 6,439,723 | B1 | * | 8/2002 | Tano ........................... 353/15 |
| 6,703,930 | B2 | * | 3/2004 | Skinner ................. 340/539.11 |
| 6,809,642 | B1 | * | 10/2004 | Brenner ...................... 340/506 |
| 2002/0167392 | A1 | * | 11/2002 | Williams ..................... 340/3.3 |
| 2003/0084109 | A1 | * | 5/2003 | Balluff ........................ 709/206 |

FOREIGN PATENT DOCUMENTS

| JP | 6-12381 | 1/1994 |
| JP | 3065782 | 11/1999 |
| JP | 2000-29661 A | 1/2000 |
| JP | 3079330 | 5/2001 |

* cited by examiner

*Primary Examiner*—Daniel Wu
*Assistant Examiner*—Samuel J. Walk
(74) *Attorney, Agent, or Firm*—Madson & Metcalf (57) ABSTRACT

An apparatus for taking an electronic message from a user and actively notifying a receiver is disclosed. The apparatus includes a message input device for receiving the electronic message from the user, a message storing device for storing the electronic message therein, a message playing device for playing the electronic message, a vibration detector for detecting a certain level of vibration, a controller electrically connected to the message input device, the message storing device, the message playing device and the vibration detector, and a case accommodating the message input device, the message storing device, the message playing device, the vibration detector and the controller therein. The vibration detector sends out a trigger signal in response to the vibration, and the controller allows the electronic message to be read out from the message storing device and played by the message playing device in response to the trigger signal.

16 Claims, 6 Drawing Sheets

ELECTRONIC MESSENGER

FIELD OF THE INVENTION

The present invention relates to an apparatus for taking an electronic message from a user, and more particularly to an apparatus for taking an electronic message from a user and actively notifying a receiver.

BACKGROUND OF THE INVENTION

A traditional message-leaving device is a note board based on hand writing. With the development of electronic industry, a voice recorder such as an answering machine is used for leaving voice message. These traditional message-leaving devices, however, are not efficient and user-friendly enough due to their passive and monotonous features.

First of all, both types of above message-leaving devices cannot actively transmit the message to the receiver. In other words, they work only when the receiver purposely checks whether there is any message on the note board or in the answering machine. Hence, once the receiver forgets to check or does not pay attention to the message-leaving device, some important messages are likely to be missed out or delayed.

Moreover, the traditional message-leaving devices permit only of simple characters or voices to express their thoughts and emotion. Sometimes, such expression is not enough for transmitting exactly what the user wants to convey to the receiver. For example, it helps little when the user would like to instruct the receiver how to operate an appliance. Further, it is inconvenient for the people who cannot give and take messages by handwriting or speaking. For example, one or both of the user and the receiver cannot read or write, or they have difficulty in listening or speaking.

Therefore, the purpose of the present invention is to develop an apparatus for taking an electronic message from a user and actively notifying a receiver, which is called herein as an electronic messenger, to deal with the above situations encountered in the prior art.

SUMMARY OF THE INVENTION

An object of the present invention is to provide an apparatus for taking an electronic message from a user and actively notifying a receiver for preventing the electronic message from being delayed or missed out.

Another object of the present invention is to provide an apparatus for taking an electronic message for some handicapped people to conveniently operate.

According to an aspect of the present invention, there is provided an apparatus for taking an electronic message from a user and actively notifying a receiver. The apparatus includes a message input device for receiving the electronic message from the user, a message storing device for storing the electronic message therein, a message playing device for playing the electronic message, a vibration detector for detecting a certain level of vibration, a controller electrically connected to the message input device, the message storing device, the message playing device and the vibration detector, and a case for accommodating the message input device, the message storing device, the message playing device, the vibration detector and the controller therein. The vibration detector sends out a trigger signal in response to the vibration, and the controller allows the electronic message to be read out from the message storing device and played by the message playing device in response to the trigger signal.

For example, the message storing device can be a memory device.

For example, the message input device can include at least one of an image input device, a voice input device, a digital tablet and a touch panel.

For example, the image input device can be a charge-coupled device (CCD) camera or a complementary metal-oxide semiconductor (CMOS) image sensor.

Preferably, the message playing device includes a liquid crystal display for presenting an image message which is a designed pattern, a handwriting note, a photo picture or a motion picture.

In an embodiment, the message input device is a touch panel integrated with the liquid crystal display, which allows the user to leave the electronic message by pointing one of predetermined selective items on the liquid crystal display.

For example, the liquid crystal display can be a thin film transistor liquid crystal display, a color super twisted nematic liquid crystal display or a monochrome super twisted nematic liquid crystal display.

For example, the voice input device can be a microphone and the message playing device can include a speaker for presenting a voice message.

For example, the controller can be a digital signal processor (DSP) or an application specific IC (ASIC).

Preferably, the vibration detector is a spring-type vibration detector or a mercury-type vibration detector.

Preferably, the apparatus further includes a button for starting the controller to play the electronic message in response to a pressing operation of the receiver exerted thereon.

Preferably, the apparatus further includes a timer electrically connected to the controller for playing the electronic message at a preset time point.

According to another aspect of the present invention, there is provided an apparatus including a message input device for receiving the electronic message from the user, and receiving a surrounding information in real time, a message storing device for storing the electronic message therein, a message playing device for playing the electronic message, a controller electrically connected to the message input device, the message storing device and the message playing device, and in response to a change of the surrounding information exceeding a threshold level, allowing the electronic message to be read out from the message storing device and played by the message playing device, and a case for accommodating the message input device, the message storing device, the message playing device and the controller therein.

Preferably, the message input device includes an image input device. For example, the image input device can be a charge-coupled device (CCD) camera or a complementary metal-oxide semiconductor (CMOS) image sensor.

Preferably, the message input device includes a voice input device. For example, the voice input device can be a microphone.

According to an additional aspect of the present invention, there is provided an apparatus including a message input device for receiving the electronic message from the user, a message storing device for storing the electronic message therein, a message playing device for playing the electrical message, a motion detector detecting a movement of an environmental object, a controller electrically connected to the message input device, the message storing device, the message playing device and the motion detector and a case for accommodating the message input device, the message storing device, the message playing device, the motion detector and the controller therein. The motion detector sends out a trigger signal in response to a certain level of the movement, and the controller allows the electronic message to be read out from the message storing device and played by the message playing device in response to the trigger signal.

Preferably, the motion detector is an infrared-ray motion detector.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
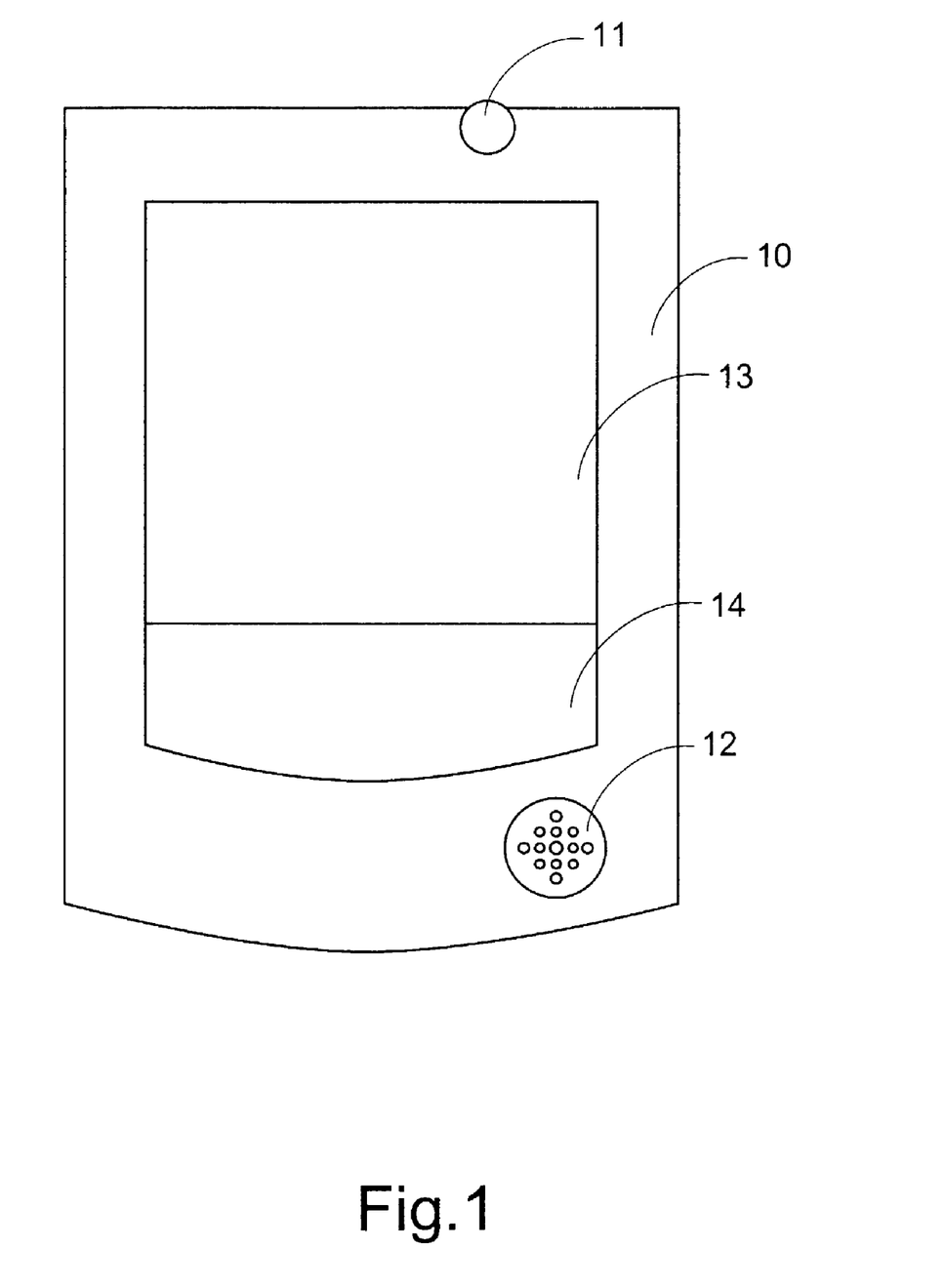
FIG. 1 is an appearance diagram illustrating a preferred embodiment of an apparatus for taking an electronic message according to the present invention.

Please refer to FIG. 1 which is an appearance diagram illustrating a preferred embodiment of an apparatus for taking an electronic message according to the present invention. As shown in FIG. 1, the size of the electronic message-leaving apparatus, which is called as the electronic messenger hereinafter, is preferably made to be similar to that of a personal digital assistant (PDA) so that it is convenient to be carried by the user and mounted in a proper place. For example, the electronic messenger can be adhered, hung or disposed on the wall, the table, the door, the door of a refrigerator or any other place where the electronic messenger can be easily operated. The electronic messenger includes a message input device for inputting a message therefrom. The message input device, for example, optionally includes a charge-coupled device (CCD) camera 11, a microphone 12, a liquid crystal display (LCD) 13, and/or a digital tablet 14 all accessibly accommodated in a case 10. The CCD camera 11 permits for image input, either for a still picture or a motion picture. The microphone 12 permits for voice input. The LCD 13 may serve as a touch panel for input by pointing one of predetermined selective items on the display. The selected items may be patterns or words or any other suitable forms. The digital table 14 permits for handwriting input. Aside from a message input device as a touch panel, the LCD also serve as a message playing device for presenting the message in a visible form. As for the message in an audible form, it can be presented by an audio message playing device such as a speaker (not shown in FIG. 1).

Figure 2A:
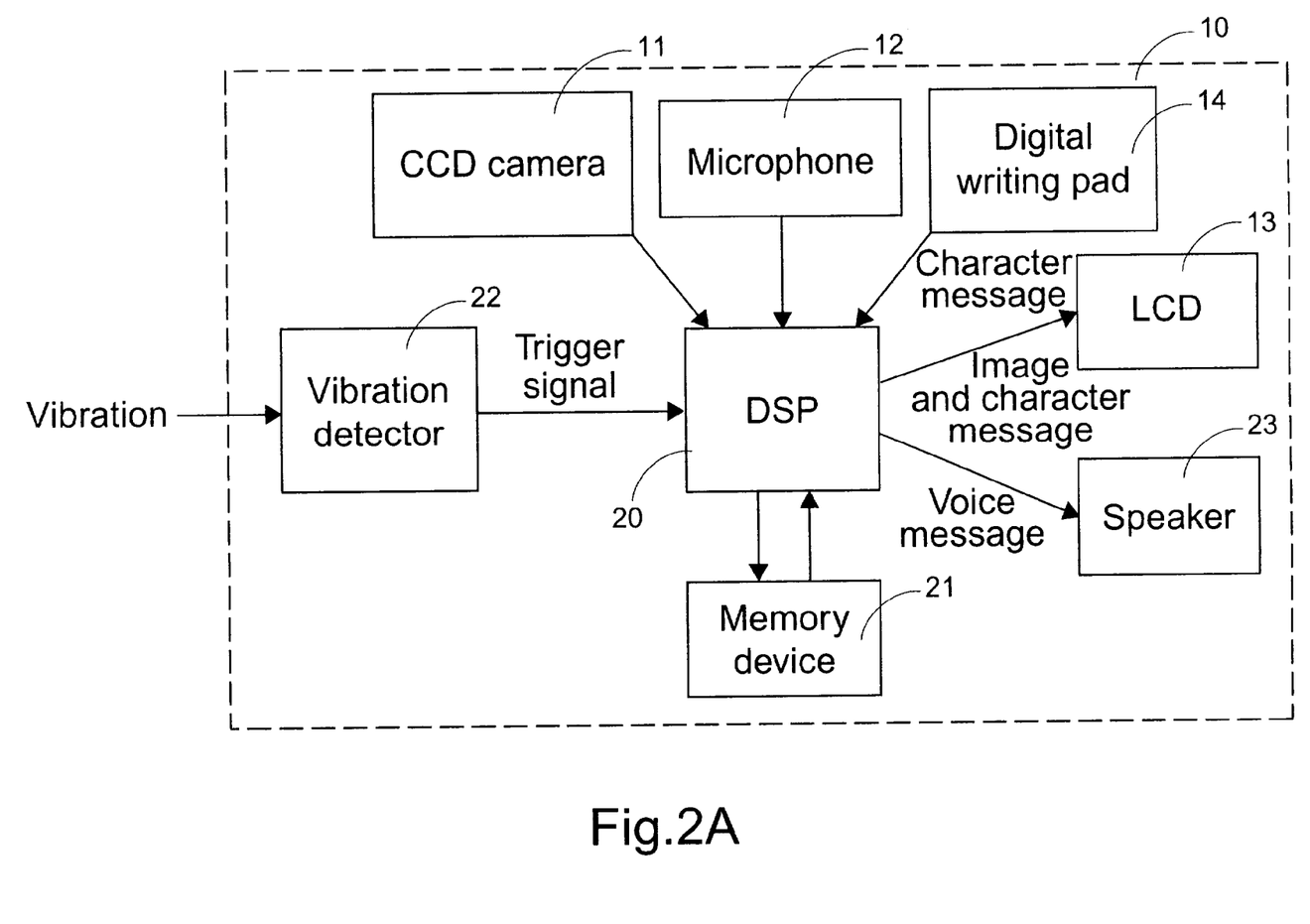
FIG. 2A is a functional block diagram illustrating the electronic message-leaving apparatus of FIG. 1.

Please refer to FIG. 2A which is a functional block diagram illustrating the electronic message-leaving apparatus of FIG. 1. For allowing the message given via the message input device shown in FIG. 1 to be presented in front of a receiver, the electronic messenger also includes a digital signal processor (DSP) 20, a memory device 21, and a vibration detector 22 disposed inside the case 10. The digital signal processor 20 is electrically connected to the charge-coupled device camera 11, the microphone 12, the liquid crystal display 13, the memory device 21, the vibration detector 22, and the speaker 23. The memory device 21 is used for storing therein the given message. When the vibration detector 22 detects a vibration level exceeding a predetermined value, the vibration detector 22 sends out a trigger signal to the digital signal processor 20 which allows the image, handwriting, pattern, character andlor voice messages to be read out in response to the trigger signal. Then, the visible message is played on the liquid crystal display 13 and the voice message is broadcasted from the speaker 23. For example, a user left messages in the electronic messenger via at least one of the message input devices and adhered the electronic messenger on the door of a refrigerator. Once the door of the refrigerator is opened, the vibration detector 22 will detect the vibration and send out the trigger signal to allow the electronic messages to be automatically played. Thus, the electronic messenger according to the present invention can actively notify the receiver of the presence and the contents of messages, thereby avoiding important messages being delayed or missed out.

Figure 2B:
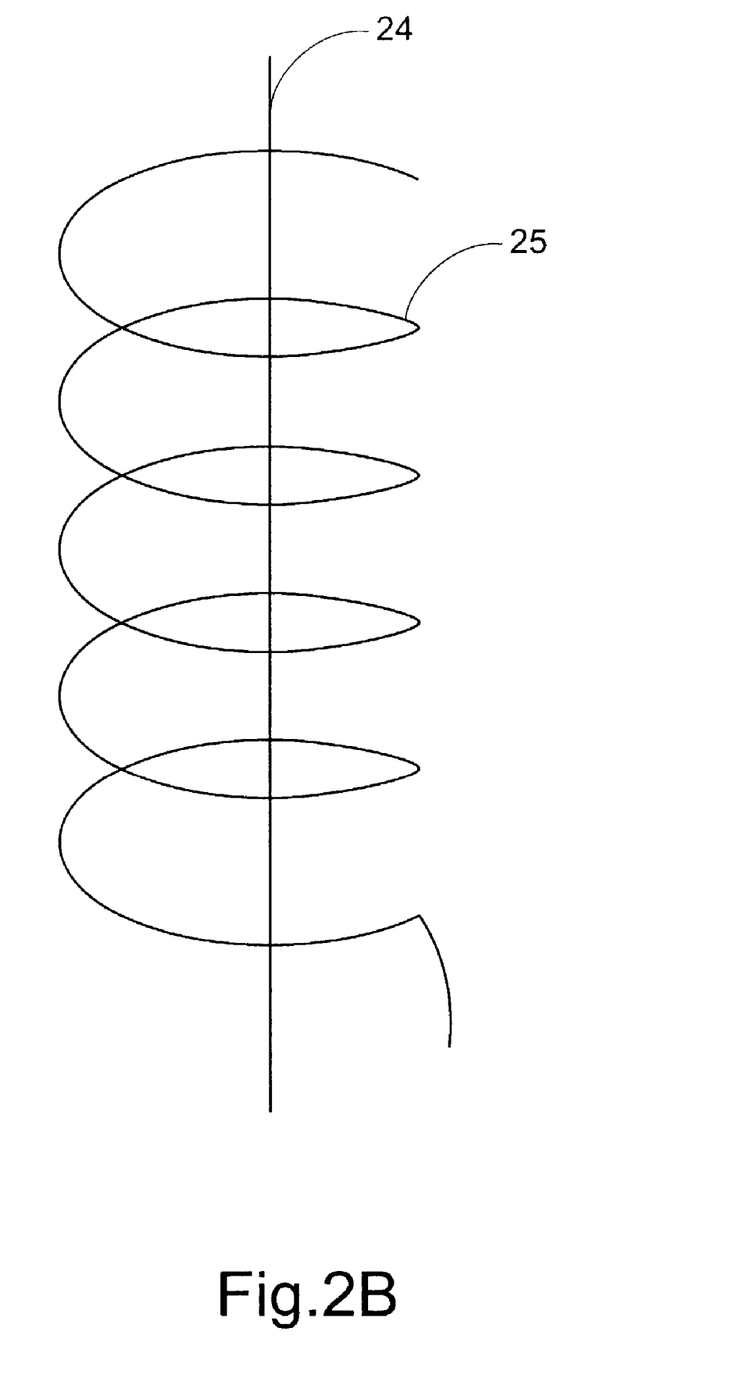
FIG. 2B is a schematic diagram illustrating a structure of a spring-type vibration detector for use in the electronic message-leaving apparatus of FIG. 2A as the vibration detector.

An embodiment of the vibration detector 22 used in the above electronic messenger is a spring-type vibration detector shown in FIG. 2B. As shown in FIG. 2B, a metal stick 24 penetrates through a spiral spring 25. When the spiral spring 25 is vibrated or trembles due to a certain level of vibration, the spiral spring 25 is in contact with the metal stick 24. Therefore, the electricity is conducted, resulting in that the spring-type vibration detector 22 sends out the trigger signal.

Figure 2C:
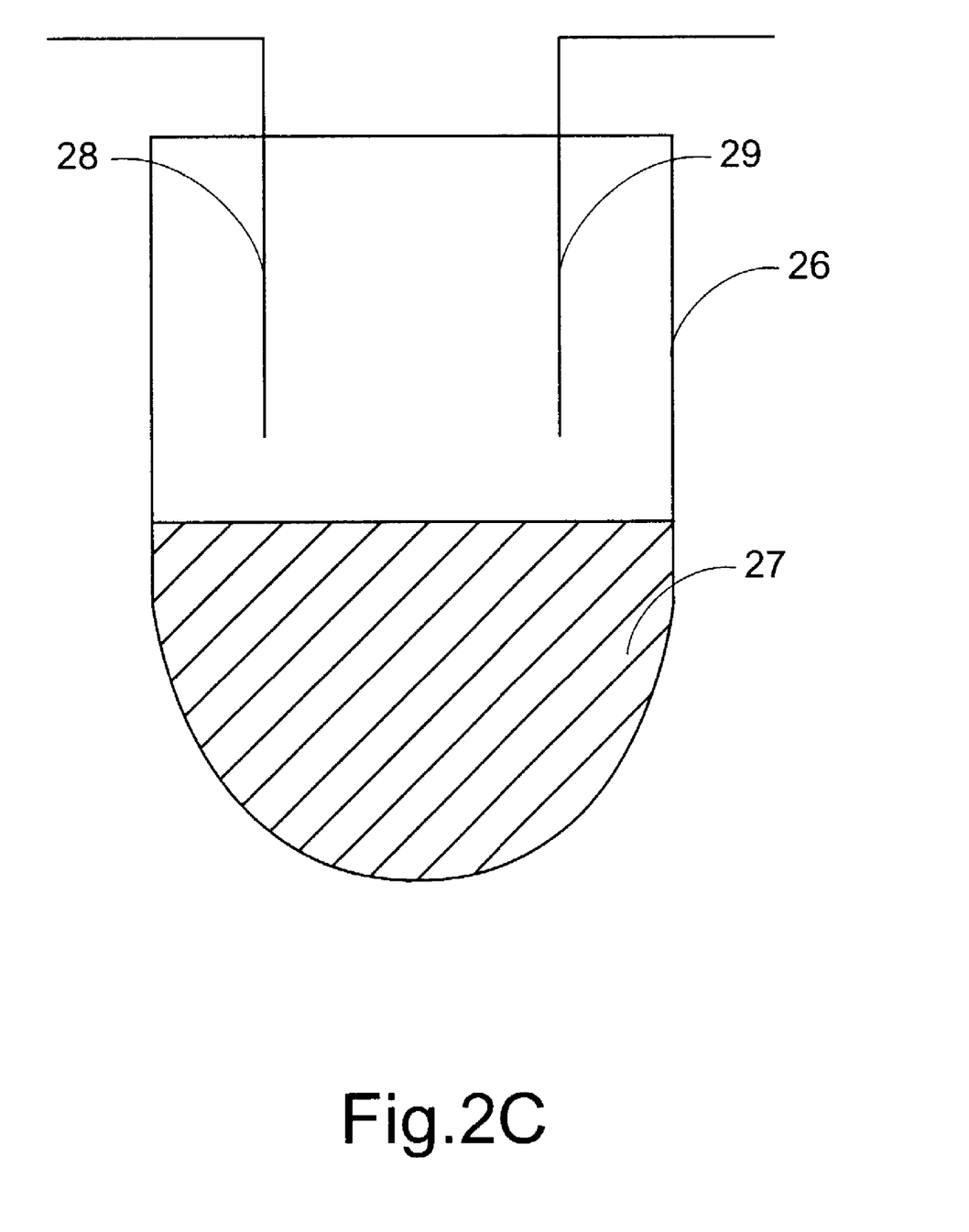
FIG. 2C is a diagram illustrating a structure of a mercury-type vibration detector for use in the electronic message-leaving apparatus of FIG. 2A as the vibration detector.

In addition, the spring-type vibration detector 22 can be replaced by a mercury-type one. As shown in FIG. 2C, the mercury-type vibration detector includes a container 26 accommodating mercury 27 therein, and two metal conductive wires 28 and 29 inserted into the container 26 and being disposed just above the liquid surface of mercury. When the container 26 is vibrated due to a certain level of vibration, the electrically conductive mercury 27 trembles and becomes in contact with both of the metal conductive wires 28 and 29. Therefore, the electricity is conducted, resulting in that the mercury-type vibration detector sends out the trigger signal.

Figure 3:
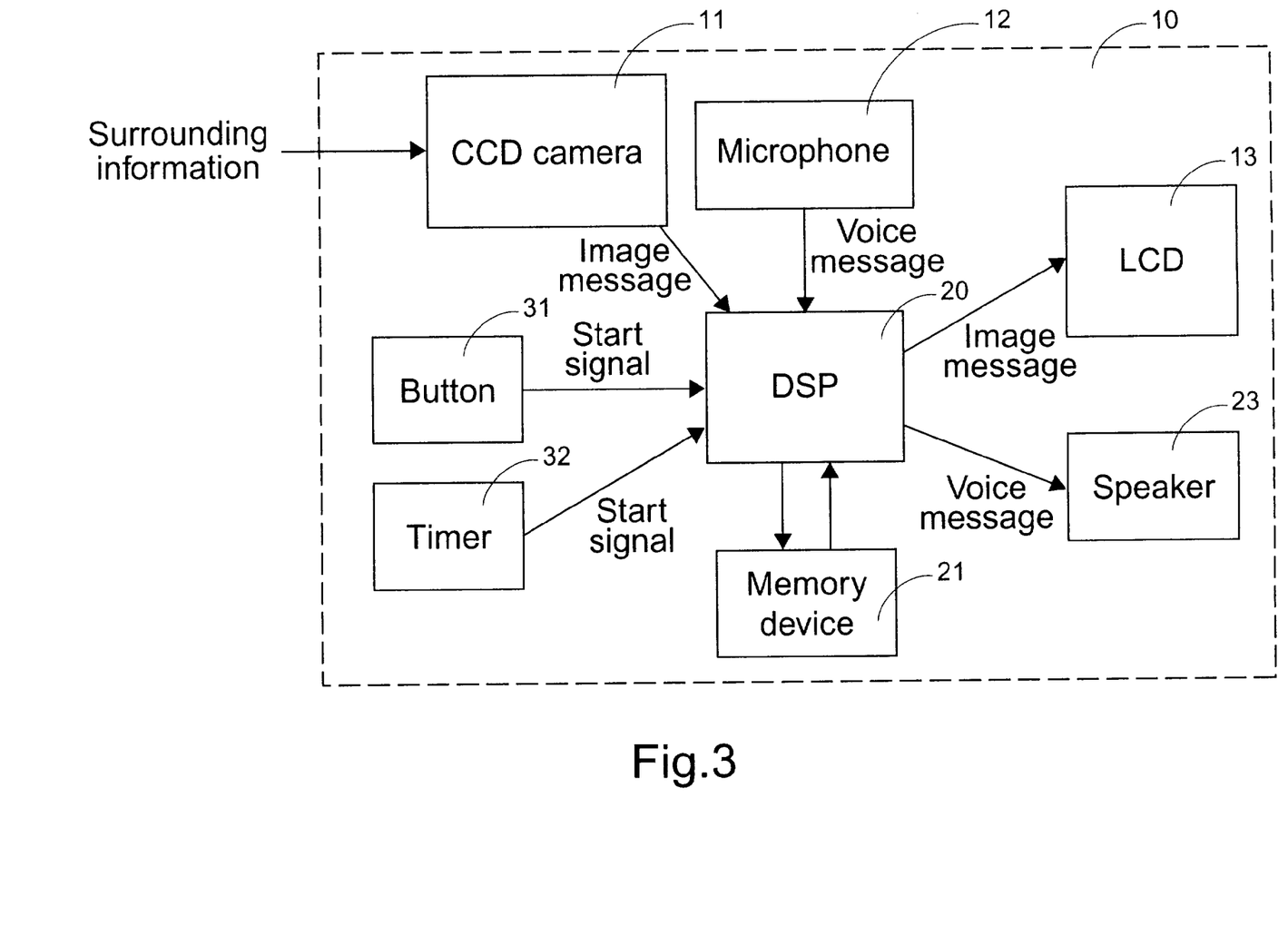
FIG. 3 is a functional block diagram illustrating another preferred embodiment of an apparatus for taking an electronic message according to the present invention.

FIG. 3 is a functional block diagram illustrating another preferred embodiment of an electronic messenger according to the present invention. The functions and structures of the electronic messenger are similar to those of the electronic messenger shown in FIG. 2A so as not to be redundantly described herein. The electronic messenger of FIG. 3, however, includes a motion sensor instead of the vibration detector 22 of FIG. 2A. As shown in FIG. 3, the charge-coupled device camera 11 is used not only as a message input device for receiving the image message from the user but also as a motion sensor for detecting a change of surrounding information in real time. In other words, after the image message, if any, is stored in the memory device 21, the charge-coupled device camera 11 still keeps operating to receive the surrounding information and transmit it to the digital signal processor 20. The image information received at this time point will be compared with the image information received at the time point just before this time point via the software program operation. When the change of image information between these two time points is larger than a threshold, the digital signal processor 20 determines that somebody approaches or passes and then allows the image and/or voice messages to be read out from the memory device 21. Further, the liquid crystal display 13 plays the image message and/or the speaker 12 broadcasts the voice message.

Moreover, as shown in FIG. 3, the electronic messenger further includes a button 31 and a timer 32. The receiver can actively check the message by touching or pressing on the button 31. The timer 32 is used to play the message at preset time especially for purpose of reminding, for example, reminding of taking medicine.

Figure 4:
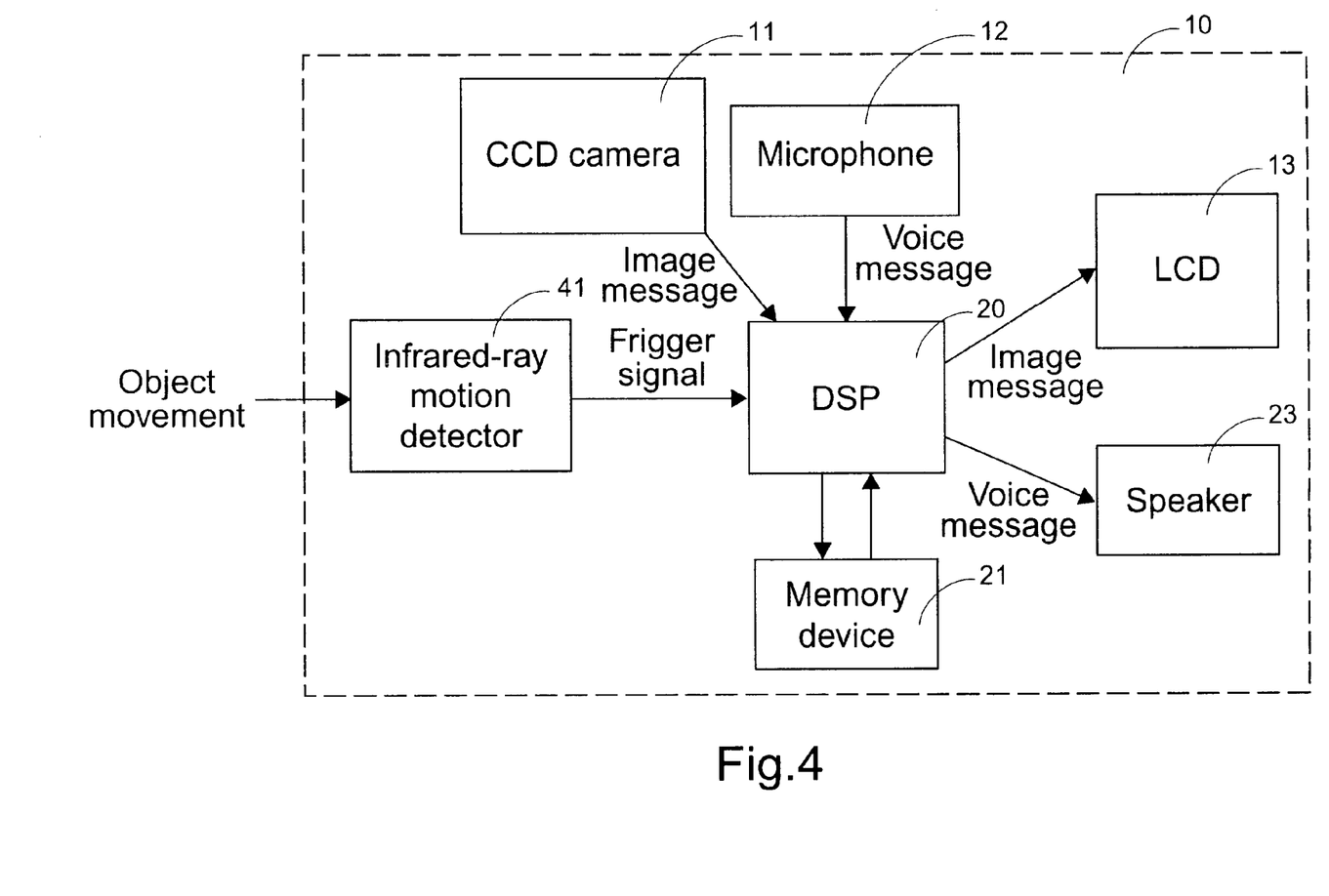
FIG. 4 is a functional block diagram illustrating a further preferred embodiment of an apparatus for taking an electronic message according to the present invention.

For another embodiment as shown in FIG. 4, the functions and structures of the electronic messenger are similar to those of the electronic messenger of FIG. 3 except that the motion detector is an infrared-ray motion detector 41. The infrared-ray motion detector 41 is connected to the digital signal processor 20 and used for detecting a movement of an environmental object. When the infrared-ray motion detector 41 sends out a trigger signal in response to a certain level of movement, the digital signal processor 20 controls the memory device 21 to send out the image and/or voice messages. Thus, the image and/or voice messages are further played by the liquid crystal display 13 and/or the speaker 23, respectively.

The liquid crystal display used in the above embodiments can be a thin film transistor liquid crystal display (TFTLCD), a color super twisted nematic liquid crystal display (color STNLCD) or a monochrome super twisted nematic liquid crystal display (monochrome STNLCD).

The charge-coupled device camera 11 can be replaced by a complementary metal-oxide semiconductor (CMOS) image sensor. In addition to the digital signal processor, an application specific IC (ASIC) specifically designed for these electronic message-leaving apparatuses can be used as a controller for reducing the cost. Furthermore, all electronic message-leaving apparatus according to the present invention can further include the button 31 and the timer 32 as the embodiment shown in FIG. 3.

To sum up, the electronic messenger according to the present invention provides a function to actively notify the receiver instead of completely depending on the receiver's attention. Thus, the electronic message from the user won't be missed out or delayed. In addition, the electronic messenger according to the present invention provides a convenient way for some handicapped people to leave or take messages. For example, those who cannot write may leave message by voice input via the microphone, and those who cannot speak may leave message by inputting sign language via the CCD camera. Of course, an indicator light or sound may be additionally provided to notify of the playing of the message. Further, the electronic messenger according to the present invention provides a way to transmit the exactly information or emotion from the user to the receiver.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for taking an electronic message from a user and actively notifying a receiver, comprising:
    an image input device for receiving a first electronic message from said user in a first state, and receiving a surrounding information in real time in a second state;
    a message storing device;
    a message playing device;
    a controller electrically connected to said image input device, said message storing device and said message playing device, and having said first electronic message stored into said message storing device in said first state and determining whether a change of said surrounding information exceeds a threshold level, in said second state, wherein said first electronic message is read out from said message storing device and played by said message playing device when said change of said surrounding information exceeds said threshold level; and
    a case accommodating said image input device, said message storing device, said message playing device and said controller therein.

2. The apparatus according to claim 1 wherein said image input device is one selected from a group consisting of a charge-coupled device (CCD) camera and a complementary metal-oxide semiconductor (CMOS) image sensor.

3. The apparatus according to claim 1 further comprising a voice input device for a user to leave a second electronic message.

4. The apparatus according to claim 3 wherein said voice input device is a microphone.

5. The apparatus according to claim 4 wherein said message playing device includes a display for presenting said first electronic message and a speaker for presenting said second electronic message.

6. The apparatus according to claim 1 further comprising a digital-tablet input device for a user to leave a third electronic message.

7. The apparatus according to claim 1 further comprising a touch-panel input device integrated with a liquid crystal display, which allows said user to leave a fourth electronic message by pointing one of predetermined selective items on said liquid crystal display.

8. The apparatus according to claim 1 wherein said message playing device includes a liquid crystal display for presenting an image message selected from a group consisting of a designed pattern, a handwriting note, a photo picture and a motion picture.

9. The apparatus according to claim 8 wherein said liquid crystal display is one selected from a group consisting of a thin film transistor liquid crystal display, a color super twisted nematic liquid crystal display and a monochrome super twisted nematic liquid crystal display.

10. The apparatus according to claim 1 wherein said controller is one selected from a group consisting of a digital signal processor (DSP) and an application specific IC (ASIC).

11. The apparatus according to claim 1 further comprising a vibration detector for detecting a certain level of vibration, wherein said controller alternatively allows said first electronic message to be read out from said message storing device and played by said message playing device in response to said certain level of said vibration exceeding a threshold level.

12. The apparatus according to claim 11 wherein said vibration detector is one selected from a group consisting of a spring-type vibration detector and a mercury-type vibration detector.

13. The apparatus according to claim 1 further comprising a button electrically connected to said controller, wherein said controller alternatively allows said first electronic message to be read out from said message storing device and played by said message playing device in response to an operation on said button.

14. The apparatus according to claim 1 further comprising a timer electrically connected to said controller, wherein said controller alternatively allows said first electronic message to be read out from said message storing device and played by said message playing device at a preset time point.

15. An apparatus for taking an electronic message from a user and actively notifying a receiver, comprising:

an image input device for receiving image information;

a message storing device;

a message playing device;

a controller electrically connected to said image input device, said message storing device and said message playing device, having said image information stored in said message storing device as said electronic message during a message input state and receiving said image information as surrounding information in a surrounding detection state, wherein said electronic message is read out from said message storing device and played by said message playing device when a change of said surrounding information exceeds a threshold level.

16. The apparatus according to claim 15 wherein said image input device is one selected from a group consisting of a charge-coupled device (CCD) camera and a complementary metal-oxide semiconductor (CMOS) image sensor.

* * * * *